(12) United States Patent
Kinsey, III et al.

(10) Patent No.: US 7,790,774 B1
(45) Date of Patent: Sep. 7, 2010

(54) PREPARATION OF GUAR SUSPENSION FROM GUAR SPLITS

(75) Inventors: E. Wayne Kinsey, III, Houston, TX (US); David Nigel Harry, Katy, TX (US); Gordon Randall Dixon, Midland, TX (US); Fati Malekahmadi, Houston, TX (US); Keith Ingram Dismuke, Katy, TX (US)

(73) Assignee: Benchmark Energy Products, LLC, Houston, TX (US)

( * ) Notice: Subject to any disclaimer, the term of this patent is extended or adjusted under 35 U.S.C. 154(b) by 0 days.

(21) Appl. No.: 12/075,360

(22) Filed: Mar. 11, 2008

Related U.S. Application Data

(60) Provisional application No. 60/895,404, filed on Mar. 16, 2007.

(51) Int. Cl.
*B01F 3/12* (2006.01)
*B01F 3/20* (2006.01)

(52) U.S. Cl. ........................................ 516/31; 536/17.1

(58) Field of Classification Search .................. 516/31; 536/17.1
See application file for complete search history.

(56) References Cited

U.S. PATENT DOCUMENTS

| | | | | | |
|---|---|---|---|---|---|
| 4,269,975 | A | * | 5/1981 | Rutenberg et al. | 536/114 |
| 4,645,833 | A | * | 2/1987 | Bayerlein et al. | 536/17.1 |
| 6,387,853 | B1 | * | 5/2002 | Dawson et al. | 507/211 |

OTHER PUBLICATIONS

Brabender Technical Data sheet.*

* cited by examiner

*Primary Examiner*—Milton I Cano
*Assistant Examiner*—Chun-Cheng Wang
(74) *Attorney, Agent, or Firm*—Christopher L. Makay

(57) ABSTRACT

A continuous process forms liquid or semi-solid suspensions of water-hydratable guar particles in a non-aqueous solvent directly from hydrated guar splits. In particular, guar splits are hydrated, compressed to form wet guar flakes, and then dried. The dried guar flakes are then combined with a non-aqueous carrier fluid. Finally, the guar and carrier fluid mixture is homogenized, and, if desired, the homogenized guar and carrier fluid mixture may be shear milled to further size-reduce the average particle size of the guar particle.

25 Claims, 4 Drawing Sheets

PREPARATION OF GUAR SUSPENSION FROM GUAR SPLITS

CROSS-REFERENCE TO RELATED APPLICATION

This present application claims all available benefit, under 35 U.S.C. §119(e), of U.S. provisional patent application Ser. No. 60/895,404 filed Mar. 16, 2007. By this reference, the full disclosure of U.S. provisional patent application Ser. No. 60/895,404 is incorporated herein as though now set forth in its entirety.

BACKGROUND OF THE INVENTION

1. Field of the Invention

This invention relates to a new and improved process for making guar or derivatized guar slurries, or more particularly, for making non-aqueous suspensions of guar or derivatized guar. Novel aspects of the invention relate to processes for the conversion of guar splits (or derivatized guar splits) to a guar slurry suitable for use in oil and gas well stimulation treatments; the combining and/or elimination of process steps as currently practiced to provide for a more economical process as expressed by lower potential for material loss; fewer process control and quality control steps; more consistent product quality; and the elimination of potentially hazardous organic dust conditions.

2. Description of the Related Art

Guar (*Cyamopsis tetragonolobus*) splits are endosperm hemispheres found in the guar bean. Grown predominantly in India and Pakistan, guar beans are processed to produce guar splits. Keen et al., U.S. Pat. No. 3,132,681 incorporated in its entirety herein by reference, teaches a process for splitting and dehulling guar beans to produce guar splits. Guar splits are imported into the United States and, as such, are the "source" material from which guar powder and derivatized guar powders are manufactured for many industrial uses, including but not limited to oil well fracturing applications.

Guar and derivatized guar powders are used extensively in well fracturing applications to produce polymer solutions and crosslinked polymer solutions (i.e., gels) suitable as fracturing fluids to translate hydraulic force sufficient to initiate and propagate a fracture. The art of well fracturing to enhance the rate of production of hydrocarbons is well known to those in the industry of oil and gas production, and fracturing fluids formulated from guar and derivatized guar products are well known to those of ordinary skill in the art. The guar and derivatized guar products used in the formulation of fracturing fluids are either finely ground powders or dispersions of those same powders in non-aqueous suspensions. Non-aqueous suspensions of guar or derivatized guar powders are typically called slurries, guar slurries, or derivatized guar slurries if, in the case of the latter, the dispersed and suspended guar powder is a derivatized guar. Guar slurries are the preferred guar product in continuous mix fracturing treatments due to the ease in which the guar or derivatized guar product can be metered to form the guar or crosslinked guar fracturing fluid. Guar derivatives typically employed in well fracturing applications include hydroxyalkyl guars, carboxyalkyl guars, and carboxyalkyl hydroxyalkyl guars. Preferred guar derivatives include hydroxypropyl guars (HPG), carboxymethyl guars (CMG), and carboxymethyl hydroxypropyl guars (CMHPG).

Numerous patents relate to the manufacture of guar powder from guar splits. Exemplary are Elverum, U.S. Pat. No. 2,891,050; Keen, U.S. Pat. No. 3,455,899; Rutenberg et al., U.S. Pat. No. 4,269,975; Wu, U.S. Pat. No. 4,659,811; Yeh, et al., U.S. Pat. No. 5,489,694; Swartz, et al., U.S. Pat. No. 6,048,563; and Wieling a, U.S. Pat. No. 6,664,381. Elements from one or more of these teachings are incorporated by those of ordinary skill in the art to the manufacture of guar powder for well stimulation applications. All are incorporated herein by reference. None relate to the manufacture of guar slurries from guar splits.

Numerous patents relate to the manufacture of derivatized guar powder from guar splits. Exemplary are Moe, U.S. Pat. No. 2,496,670; Boonstra, et al., U.S. Pat. No. 3,912,713; Trapasso, U.S. Pat. No. 4,011,393; DeGuin, et al., U.S. Pat. No. 4,169,945; Bayerlein, et al., U.S. Pat. No. 4,645,833; Wu, U.S. Pat. No. 4,659,811; and Bayerlein, et al., U.S. Pat. No. 4,745,184. Others have taught methods for the derivitization of guar from guar powder. Exemplary are Nordgren, U.S. Pat. No. 3,740,389; Trapasso, U.S. Pat. No. 4,011,393; DeMartino, et al., U.S. Pat. No. 4,031,307; Tessler, U.S. Pat. No. 4,276,414; Dawson, U.S. Pat. No. 6,387,853; and Magallanes, et al., U.S. Pat. No. 6,884,884. All are incorporated herein by reference. None teach a method for the manufacture of derivatized guar slurries from guar splits.

Exemplary of teachings that relate to the manufacture of guar and derivatized guar slurries for well stimulation applications are Hostettler, et al., U.S. Pat. No. 5,091,448; Dawson, U.S. Pat. No. 6,387,853; Harris, U.S. Pat. No. 6,818,597; Magallanes, et al., U.S. Pat. No. 6,884,884; Parris, et al., U.S. Pat. No. 7,199,084; and Lin, et al., U.S. Pat. No. 7,304,019. All are incorporated herein by reference. None teach a method for the manufacture of guar or derivatized guar slurries from guar splits.

There is an overwhelming and abiding need for an efficient process for the manufacture of guar and derivatized guar slurries utilizing guar splits as the "raw" guar component.

SUMMARY OF THE INVENTION

The present invention relates generally to methods of preparing liquid and semi-solid suspensions of guar polymer particles, or "slurry," used in oilfield well stimulation applications, and particularly to direct methods of preparing suspensions of guar particles from guar endosperm, or "splits." In some aspects, the invention is directed to an automated method for preparing guar slurry from guar splits. In other aspects, the invention is directed to a process for preparing guar slurry from guar splits at a single location. In still other aspects, the invention is directed to a method of forming a guar slurry suitable to the purposes of forming a crosslinked gel upon addition to water. Additional aspects of the invention will be apparent to those having ordinary skill in the art in view of the description of various embodiments herein with reference to the drawings.

FIG. 1 illustrates an example of a typical method currently used for preparing suspensions of guar polymer particles, also called guar slurries. As can be seen, the current method comprises at least two distinct processes, which for the purpose of clarity in distinguishing the current process from the inventive method shall be referred to collectively hereinafter as a "discontinuous process". Specifically a first process, shown in box 100, converts guar splits to guar powder, and a second process, shown in box 120 then converts guar powder to guar slurry. Where it is desirous to make a derivatized guar slurry, the current process merely substitutes a derivatized guar powder for the guar powder. The splits-to-powder process typically begins with hydrating the guar splits at step 102, followed by a flaking step 104 where the hydrated guar splits are run through compression equipment, such as a flaker or an extruder. Next, the flakes of hydrated guar splits are dried at step 106, then passed through a grinder, usually a hammer mill, to achieve size reduction and powder formation at step 108. At step 110, the guar powder is screened to remove particles above a certain size. Where the guar powder thusly made is intended to be used in the manufacture of guar slurries for well stimulation applications, the guar powder is typically blended with dry chemical additives, such as organophilic clays, which serve to suspend the guar powder in the non-aqueous solvent of process 120. The guar powder is packaged at step 112. The packaged guar powder of step 112 is often referred to as a "slurriable" guar powder due to the presence of suspending organophilic clays. The powder-to-slurry process at step 120 typically begins with packaged "slurriable" guar powder at step 122, which is then mixed with a non-aqueous solvent at step 124. For example, see Hostettler, et al., U.S. Pat. No. 5,091,448; Harris, U.S. Pat. No. 6,818,597; Parris, et al., U.S. Pat. No. 7,199,084; and Lin, et al., U.S. Pat. No. 7,304,019 for compositions of and methods for manufacturing guar and derivatized guar slurries. The mixture of guar powder and non-aqueous solvent is then stored in appropriate containers and provided as guar slurry. The non-aqueous solvent is typically selected from, but not limited to, one or more of diesel, kerosene, isoparaffinic oils, medicinal oils, and the like to provide a medium in which the guar can be dispersed and suspended without hydrating until added to water in advance of or during a well stimulation treatment.

Currently, processes 100 and 120 are performed by a different company and/or at different locations, hence the basis for referring to this practice as a "discontinuous process". The splits-to-powder process in 100, for example, is performed at one location by a guar powder manufacturing company. The "slurriable" guar powder is then shipped to another location where a slurry service company or an oilfield pumping services company performs the powder-to-slurry process in 120. This division of labor results in a discontinuous process that is inherently inefficient for many reasons, including the fact that any delay at the first location results in a delay at the second location due to their geographical separation. Secondly, it is expensive and time-consuming to package the "slurriable" guar powder and ship it to a separate location. Further, this method is inefficient because it introduces the potential for loss of product and the cost of waste collection in the packaging and un-packaging of the "slurriable" guar powder. There are also the hazards of dealing with a guar dust, at both during its manufacture as a powder and again when the guar powder is dumped into a mixer to be blended into the non-aqueous carrier solvent to form the slurry suspension. Finally, there are other inefficiencies related to variability in the quality of the "slurriable" guar powder with respect to additional quality assurance checks and increased variability in process control parameters in the manufacture of the guar slurry.

The present invention improves upon the existing method (and system used therein) by preparing guar slurry directly and continuously from hydrated guar splits. In particular, guar splits are hydrated, compressed to form wet guar flakes, and then dried. The dried guar flakes are then combined with a non-aqueous carrier fluid. Finally, the guar and carrier fluid mixture is homogenized, and, if desired, the homogenized guar and carrier fluid mixture may be shear milled to further size-reduce the average particle size of the guar particle. The present invention accordingly uses hydrated guar splits to form liquid or semi-solid suspensions of water-hydratable guar particles in a non-aqueous solvent employing a continuous process, thereby improving over previous discontinuous processes.

DETAILED DESCRIPTION OF THE INVENTION

In some embodiments of the invention, the method for direct preparation of guar slurry from guar splits comprises hydrating the guar splits, compressing or flaking the hydrated guar splits, drying or de-watering the compressed-flaked guar splits, adding the dried flaked guar splits to a non-aqueous solvent, and homogenizing the non-aqueous solvent guar mixture to form a stable suspension of guar particles. In these embodiments of the invention, the direct splits-to-slurry process is continuous. In some embodiments, this guar slurry preparation method may be an automated method. Continuous means that all of the steps of the method may be performed at a single location. Automated means that one or more steps of the method may be performed in an automated manner (i.e., with little or no operator intervention) using automated equipment. In some embodiments, the method may further include, as desired, carboxyalkylating and/or hydroxyalkylating the guar by reacting hydrated splits with suitable chemical derivitization chemistries.

In some embodiments, the continuous and automated method identified above may contain additional process elements such as side-stream batch additive processes, re-circulation processes, and material extraction and recovery processes. Specifically, a side-stream batch additive process may also comprise the addition of suspension aids to non-aqueous solvents. The suspension aids may include, but are not limited to, organophilic clays, amorphous silicas, emulsifiers, suspending polymers, and mixtures thereof. A material extraction and recovery process may additionally comprise the removal of water added to the splits in a hydration step, and the recovery of that water for re-use. Finally, a re-circulation process may further comprise the recirculation of non-aqueous solvents until the prescribed quantity of processed guar splits in the guar polymer suspension is attained. The non-aqueous solvents may be selected from the list consisting of hydrocarbon oils, medicinal oils, vegetable oils, polyols, glycols, glycol ethers, polyethylene glycols, alcohols, and mixtures thereof. Additional process elements in the embodiment of the invention are continuous, as the term is used here, in that they are all performed at a single same process location and in a more efficient manner."

Figure 2:
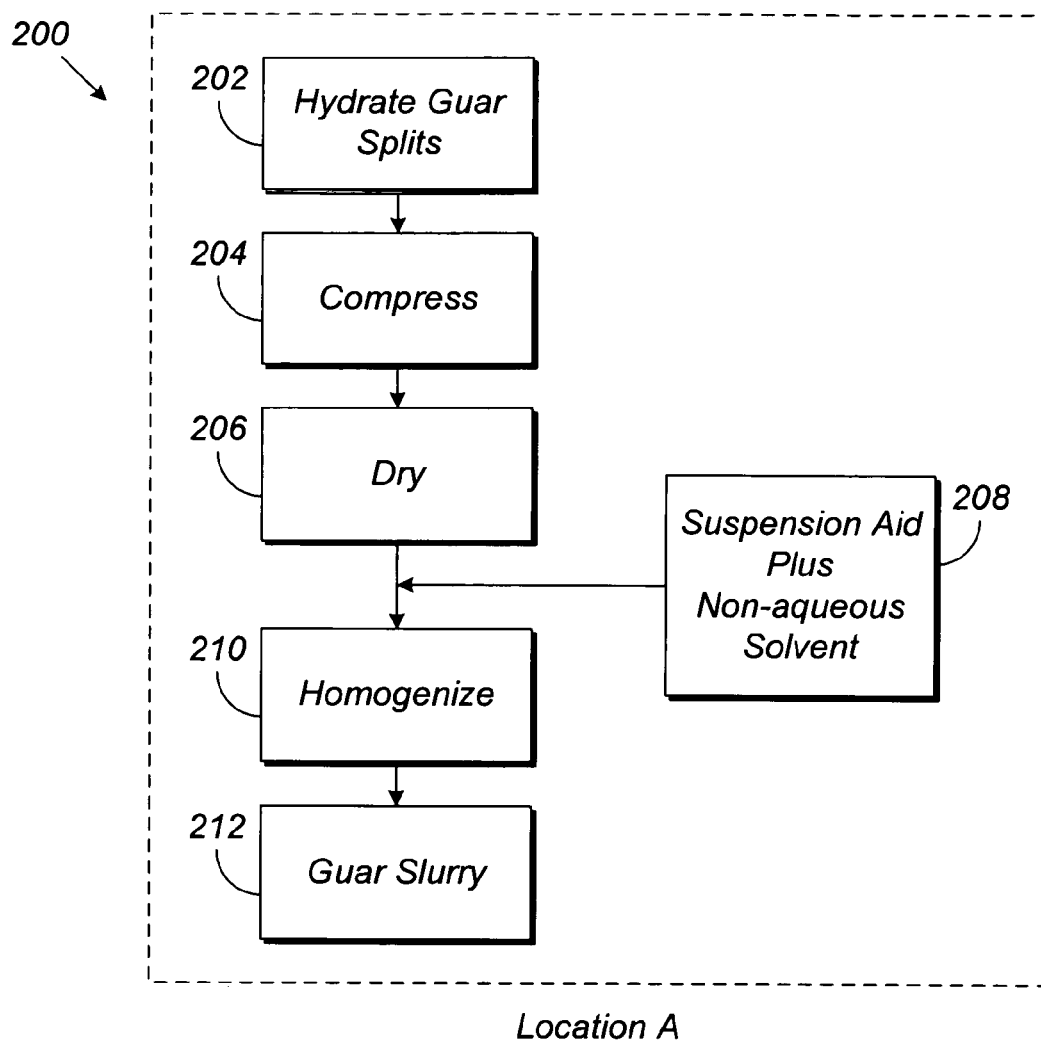
FIG. 2 is a block diagram illustrating a continuous method of preparing guar slurry directly from hydrated guar splits.

An example of the above method is illustrated in FIG. 2 via flow chart 200 according to some embodiments of the invention. It should be noted that, although the flow chart 200 is composed of discrete steps, several steps may be combined to form one step, or one or more steps may be divided into several constituent steps, without departing from the scope of the invention.

Referring to FIG. 2, guar slurry preparation according to embodiments of the invention begins at step 202, where guar splits are hydrated. The guar splits may be hydrated sufficiently to achieve a moisture content of about 20% to about 80% by weight of the total weight of the guar splits. Any suitable hydration equipment known to those having ordinary skill in the art may be used.

At step 204, the hydrated guar splits are compressed (i.e., flaked) using, for example, any one of numerous devices operating at compression pressures of about 1,000 psig. In a preferred embodiment, one of several commercially available flakers, such as those offered by Ferrell-Ross of Hereford, Tex., may be used to compress the hydrated guar splits.

In some embodiments, the hydrated guar splits may also be compressed by machine processing through a burr mill, an extruder, a roller mill, or a combination of compressing devices. The hydrated guar splits may also be compressed by one or more of a roller mill or a double-set roller mill. Such double flaking has resulted in an unexpected benefit in that viscosity is enhanced in terms of the hydration rate.

The compressed hydrated guar splits, often referred to as guar "flakes," are then dried (de-watered) at step 206 using any technique known to those having ordinary skill in the art, including air drying, oven drying, drum drying, filtering, evaporative drying, fluid bed drying, centrifuging, flash drying, addition of solvents, freeze drying and the like.

After drying, the flaked guar particles are mixed at step 208 with a non-aqueous solvent containing a suspension aid (e.g., using an eductor), and the non-aqueous solvent/de-watered guar splits mixture is homogenized at step 210 to form a non-aqueous suspension of guar particles (i.e., guar slurry) at step 212. The suspension aid may include, but is not limited to, organophilic clays, amorphous silicas, emulsifiers, suspending polymers, and mixtures thereof. Similarly, the non-aqueous solvent may include, but is not limited to, hydrocarbon oil, medicinal oil, or a vegetable oil, and the like. In most embodiments, the mixing may be performed using any technique known to those having ordinary skill in the art. In a preferred embodiment, the mixing is performed using a shear mixer, such as those available from Vortex Ventures, Inc. of Houston, Tex., in order to homogenize the guar slurry.

Where it is desirable to reduce the average particle size of the guar particulate homogenized in the guar slurry, the homogenization step 210 may include passage of the slurry through one or more shear mills. Those of ordinary skill in the art are cognizant of the relationship between soluble particles and their rate of dissolution wherein the rate of dissolution is increased as the particle size is decreased. Likewise, the rate of hydration of a guar particulate to form a viscous polymer solution once the guar particle is contacted with water is increased as the average particle size in the homogenized slurry is decreased. In the preferred embodiment of the invention, the homogenized guar slurry is passed through one or more in-line shear mills to achieve the desired particle size distribution of the suspended guar particulates to provide a guar slurry suitable to the purposes of well stimulation applications.

As can be seen from the foregoing, the guar slurry preparation method of the invention is a continuous method, meaning that the entire method, from hydrated splits to guar slurry, may be performed at a single location. This allows a single slurry service company to perform all the steps of the method instead of dividing the steps amongst two or more companies, as is the case with existing methods. And because the steps may be performed at a single location, the slurry preparation method of the invention is amenable to automation. That is, one or more steps of the method may be implemented using automated equipment arranged so that the guar splits move from point to point automatically (similar to, for example, an assembly line).

Figure 1:
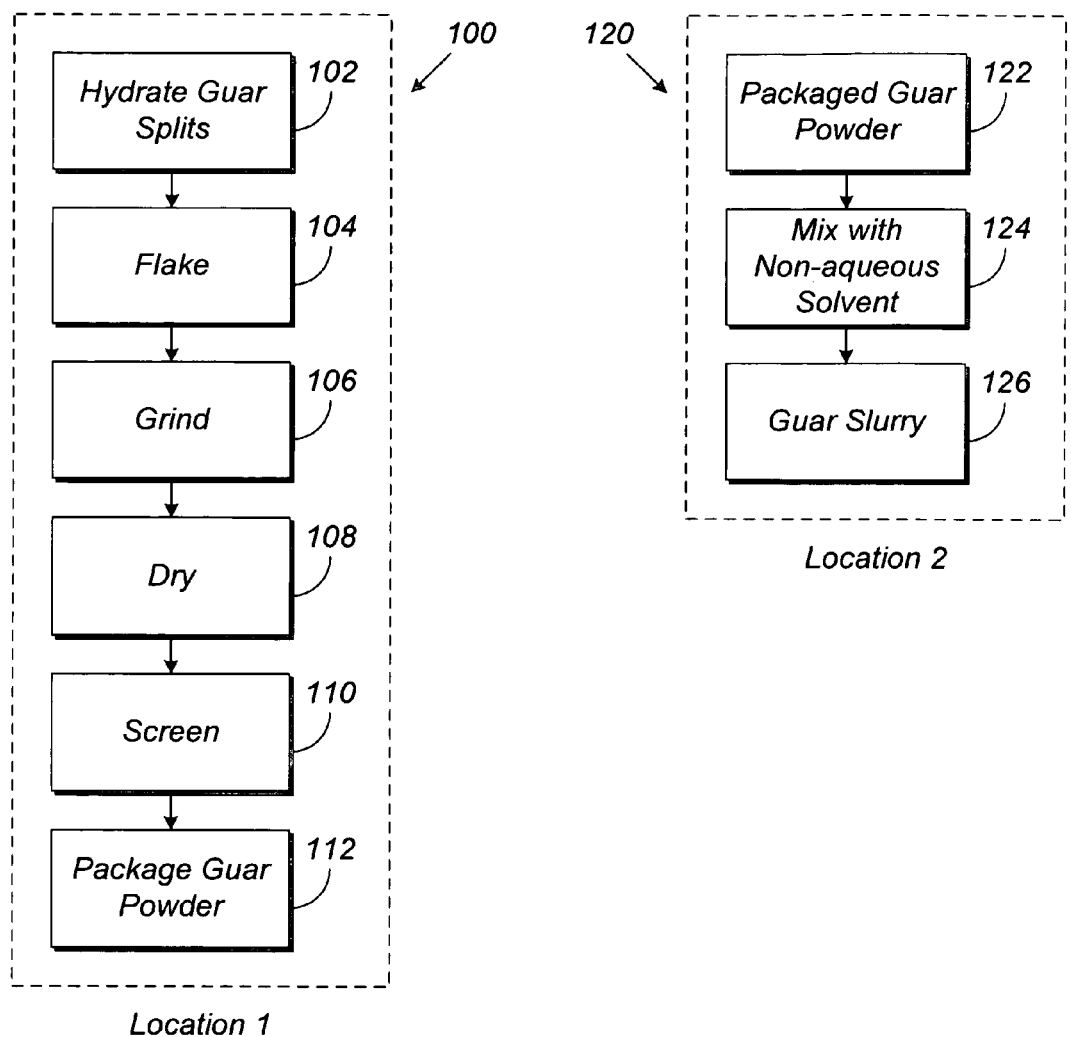
FIG. 1 is a block diagram illustrating prior art discontinuous process for preparing suspensions of guar polymer particles.

Note in the above referenced method that the powder packaging step present in prior art FIG. 1 is omitted because the dried guar is converted directly into guar slurry. This results in improved efficiency for the method of the invention compared to the method of FIG. 1. In addition, instead of grinding and screening the guar particles, the method of the invention uses shear milling to homogenize the guar particles in the solvent suspension making the inventive process virtually dust-free.

In some embodiments, the guar slurry preparation method of FIG. 2 uses water having a temperature from about 40° F. to about 200° F. to hydrate the guar splits and a hydration period of at least 0.25 hours. The hydrated guar splits may contain a moisture content of about 20% to about 80% by weight of the total weight of the guar splits. In some embodiments, the guar splits to be processed have less than about 15% moisture by weight of their total weight (prior to hydration) and are more than about 85% de-hulled. Hydration of the guar splits has long been known to be a necessary process step in the manufacture of guar powder suitable for use in well stimulation treatments. See Elverum, et al., U.S. Pat. No. 2,891,050. However, insomuch as it is necessary to also substantially dry the hydrated guar splits before they can be further processed and dispersed in a non-aqueous carrier solvent, it is a prudent process step to use as little water as necessary to achieve satisfactory hydration of the guar split. Preferably, the hydrated guar splits contain a moisture content of less than 60% by weight of their total weight. More preferably, the hydrated guar splits contain a moisture content of less than 50% by weight of their total weight.

In some embodiments, the hydrated guar splits may be compressed by machine processing through a burr mill, an extruder, a roller mill, or a combination of compressing devices. Compressed hydrated guar splits are termed "flakes," or "wet flakes." The hydrated guar splits may also be compressed by one or more of a roller mill or a double-set roller mill wherein the rollers are set at rates of rotation relative to each other at ratios of from about 5:1 to about 25:1. Such multi-flaking has resulted in an unexpected benefit in that viscosity is enhanced in terms of the hydration rate.

In some embodiments, the hydrated and compressed guar splits (i.e., wet guar flakes) may be dewatered by flash-drying, transit through a heated auger, and the like. When used, the heated auger may have an inlet operating temperature from about 200° F. to about 1000° F. and preferably from about 600° F. to 900° F. In addition, the heated auger may comprise a bank of heated augers set in parallel. Flash-drying may be achieved by passing the wet guar flakes through a turbine dryer, such as that manufactured by Scott Equipment, New Prague, Minnesota. The method of drying dictates the parameters necessary to achieve a dried product without sacrificing the intrinsic property of the guar or derivatized guar flake to produce sufficient viscosity upon addition of the final product to water to be useful as a polymer solution for well stimulation applications. Those of ordinary skill in the art of manufacturing high viscosity guar powders for well stimulation applications recognize the need to balance the drying temperature with the rate of drying in the drying method employed to retain the viscosifying properties of the guar or derivatized guar product.

In some embodiments, de-watered compressed guar splits (i.e., dried guar flakes) may contain a moisture content of about 2.0% to about 20% by weight of their total weight. It is also preferable for the dried guar flakes to contain a moisture content of less than about 15% by weight of their total weight. It is more preferable for the dried guar flakes to contain a moisture content of less than about 10% by weight of their total weight. In some embodiments, the removed water is collected and recovered.

In some embodiments, the dried guar flakes are combined with the non-aqueous solvent by means of a homogenizing mixer. The concentration of dried guar flakes combined with the non-aqueous solvent may be set by a pre-determined value for the specific gravity for the splits/solvent suspension. In some embodiments, the homogenizing mixer incorporates a shear mixing mechanism to cause particle size reduction of the dried guar flake. The homogenizing mixer incorporating the shear mixing mechanism may form a suspension of guar particles wherein the particle size of the guar is less than 150 microns. The homogenizing mixer incorporating the shear mixing mechanism may also form a suspension of particles wherein more than 90% of the guar particles are from about 20 microns to about 60 microns in diameter. "Wet" shear mixing to reduce the average particle size of the guar particles in the homogenized slurry suspension may be accomplished by passing the homogenized slurry through one or more of a colloid mill, a coball mill, or a combination of such mills. To facilitate the quantity of homogenized guar or derivatized guar slurry in a manner to maintain continuity of production to match the rate of product as produced with the homogenizing mixer while producing a final product having the desired average particle size distribution it may be necessary and beneficial to incorporate such shear mills in quantity and in parallel and in series. Further, it may be necessary to incorporate more than one shear mill cutting head, or a series of smaller size mill openings, or smaller diameter beads (in the case of a coball mill) in the same type mill to achieve the desired average particle size distribution of the guar particles in suspension.

In some embodiments, the stable suspension of guar particles may be liquid and may comprise from about 20% to about 60% guar by weight of the total weight and from about 40% to about 80% non-aqueous solvent by weight of the total weight. "Liquid" is defined here as having the property of being freely flowable at room temperature. In some embodiments, the stable suspension of guar particles may be semi-solid (i.e., a paste) and may comprise from about 60% to about 80% guar by weight and from about 20% to about 40% non-aqueous solvent by weight of the total weight.

Automation of the process to convert guar splits to a homogeneous slurry of guar particles suspended in a non-aqueous carrier is achieved by sequentially processing the guar splits by hydrating the splits; compressing the hydrated splits to form guar flakes; drying the wet flakes; combining the dried flakes with a non-aqueous carrier; homogenizing the dried guar flakes and non-aqueous carrier; and reducing the particle size of the homogenized flake as necessary to form a guar slurry suitable for use in well stimulation applications. This series of steps are proximate to each other and connected in such a fashion so that the process-step production of each step is automatically transferred to the next process-step, and so on, until the process is complete. Automation software well-known to those of ordinary skill in the art of process automation can be adapted to control each process step thereby, in the main, automatically controlling the entire process to form a guar slurry directly from guar splits.

Derivatized guar slurries, such as those made with carboxyalkyl guar particles, may also be prepared directly from hydrated guar splits using the continuous and automated method of the invention. As with guar, current practices to manufacture derivatized-guar slurries comprise a two-step process whereby the first step comprises the manufacture of a derivatized-guar powder. The second distinct step, performed at a location remote to the manufacture of the derivatized-guar powder, comprises the manufacture of the derivatized-guar slurry by the addition of the derivatized-guar powder to a non-aqueous carrier solvent. Dawson (U.S. Pat. No. 6,387, 853) teaches the carboxyalkyl derivatization of guar in-situ in a solvent, but Dawson performs the feat with the in-situ derivatization of guar already reduced to a powder and not to a process whereby guar splits are derivatized and processed into a derivatized-guar slurry in a continuous step. Dawson's teachings are also limited to the carboxyalkyl derivatization of guar and do not teach a method whereby the guar might be hydroxyalkylated.

In some embodiments, the method for direct processing of guar splits to liquid suspensions of carboxyalkyl guar particles in a non-aqueous solvent may comprise hydrating the guar splits, reacting the hydrated splits with a carboxyalkylation compound, compressing the carboxyalkylated guar splits, de-watering the compressed carboxyalkylated guar splits, adding the de-watered carboxyalkylated guar splits to a non-aqueous solvent, and homogenizing the non-aqueous solvent/de-watered carboxyalkylated guar splits mixture to form a stable suspension of carboxyalkylated guar particles.

Figure 3:
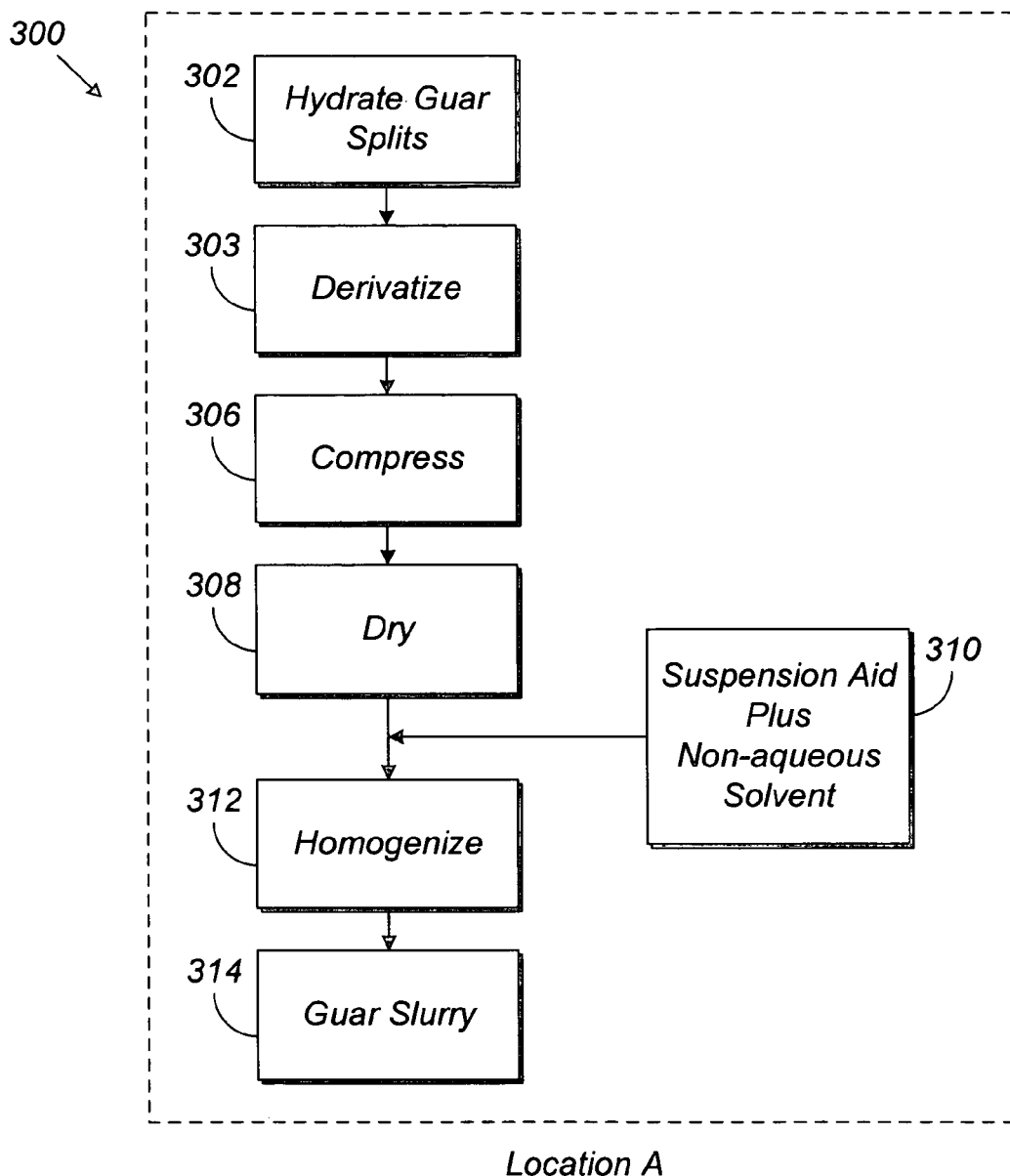
FIG. 3 is a block diagram illustrating a continuous method of preparing derivatized guar slurry directly from hydrated guar splits.

An example of the above method is illustrated in FIG. 3, where flow chart 300 outlines a continuous and automated method of preparing derivatized guar slurry directly from hydrated guar splits according to some embodiments of the invention. The method in FIG. 3 comprises hydrating the guar splits at step 302, reacting the hydrated splits with a carboxyalkylation compound at step 303, compressing the carboxyalkylated guar splits at step 306, and de-watering the compressed carboxyalkylated guar splits at step 308. The method further comprises a step 310 where the de-watered carboxyalkylated guar splits is added to a non-aqueous solvent and the non-aqueous solvent/de-watered carboxyalkylated guar splits mixture is homogenized at step 312, thereby forming a stable suspension of carboxylated guar particles at step 314.

In some embodiments, the carboxyalkylation compound may be sodium monochloroacetate (SMCA). The method may also comprise the step of washing the hydrated carboxyalkylated guar splits with water after reacting the hydrated splits with a carboxyalkylation compound. The method may further comprise washing the hydrated carboxyalkylated guar splits at a ratio of, for example, up to 20 parts water per part splits on a dry split basis.

Derivatized guar slurries, such as those made with hydroxyalkyl guar particles, may also be prepared directly from hydrated guar splits using the continuous and automated method of the invention. In some embodiments, the method for direct processing of guar splits to liquid suspensions of hydroxyalkyl guar particles in a non-aqueous solvent may comprise hydrating the guar splits, reacting the hydrated splits with a hydroxyalkylation compound, compressing the hydroxyalkylated guar splits, de-watering the compressed hydroxyalkylated guar splits, adding the de-watered hydroxyalkylated guar splits to a non-aqueous solvent, and homogenizing the non-aqueous solvent/de-watered hydroxyalkylated guar splits mixture to form a stable suspension of hydroxyalkylated guar particles.

In some embodiments, the hydroxyalkylation compound may be ethylene oxide, propylene oxide, or any combination thereof. In some embodiments, the method further comprises washing the hydrated hydroxyalkylated guar splits with water after reacting the hydrated splits with the hydroxyalkylation compound. The washing may be performed at a ratio of up to 20 parts water per part splits on a dry split basis.

In some embodiments, the method of preparing derivatized guar slurry directly from hydrated guar splits may comprise reacting the hydrated splits with both a carboxyalkylation compound and a hydroxyalkylation compound. The hydroxylation compound may be, as before, ethylene oxide, propylene oxide, or any combination thereof, and the carboxyalkylation compound may be sodium monochloracetate. In addition, the carboxyalkylated hydroxyalkylated guar splits may be carboxymethylated hydroxypropylated guar splits. As before, in some embodiments, the method may further comprise washing the hydrated carboxylated hydroxyalkylated guar splits with water after reacting the hydrated splits with both a carboxyalkylation compound and a hydroxyalkylation compound. The washing may again be performed at a ratio of up to 20 parts water per part splits on a dry split basis.

As is known in the art, the effectiveness of a guar polymer solution may be increased by adding a cross-linking agent, such as a boron cross-linking agent directly to the polymer solution. See Free, U.S. Pat. No. 3,974,077, incorporated herein by reference in its entirety. In some embodiments, the method of fracturing taught by Free may be improved by combining the boron crosslinker with the polymer in its slurry form prior to addition of the polymer and boron compound to water to form the polymer/boron crosslinker solution of Free. Therefore, in some embodiments, the method of preparing guar slurry directly from hydrated guar splits of the invention may include adding a boron cross-linking compound. Such a method of preparing derivatized guar slurry may comprise, for example, hydrating the guar splits, compressing the hydrated guar splits, de-watering the compressed guar splits, combining the de-watered guar splits with a boron compound, adding the de-watered blended guar splits to a non-aqueous solvent, and homogenizing the non-aqueous solvent/guar splits mixture to form a stable suspension of guar particles and a boron cross-linking agent. The boron crosslinking compound becomes effective to crosslink after the boron-guar slurry suspension has been added to water, the polymer allowed to yield to develop viscosity sufficient to allow for crosslinking, and raising the pH of the guar-boron slurry in water solution is raised to about pH 8.5 or greater.

Figure 4:
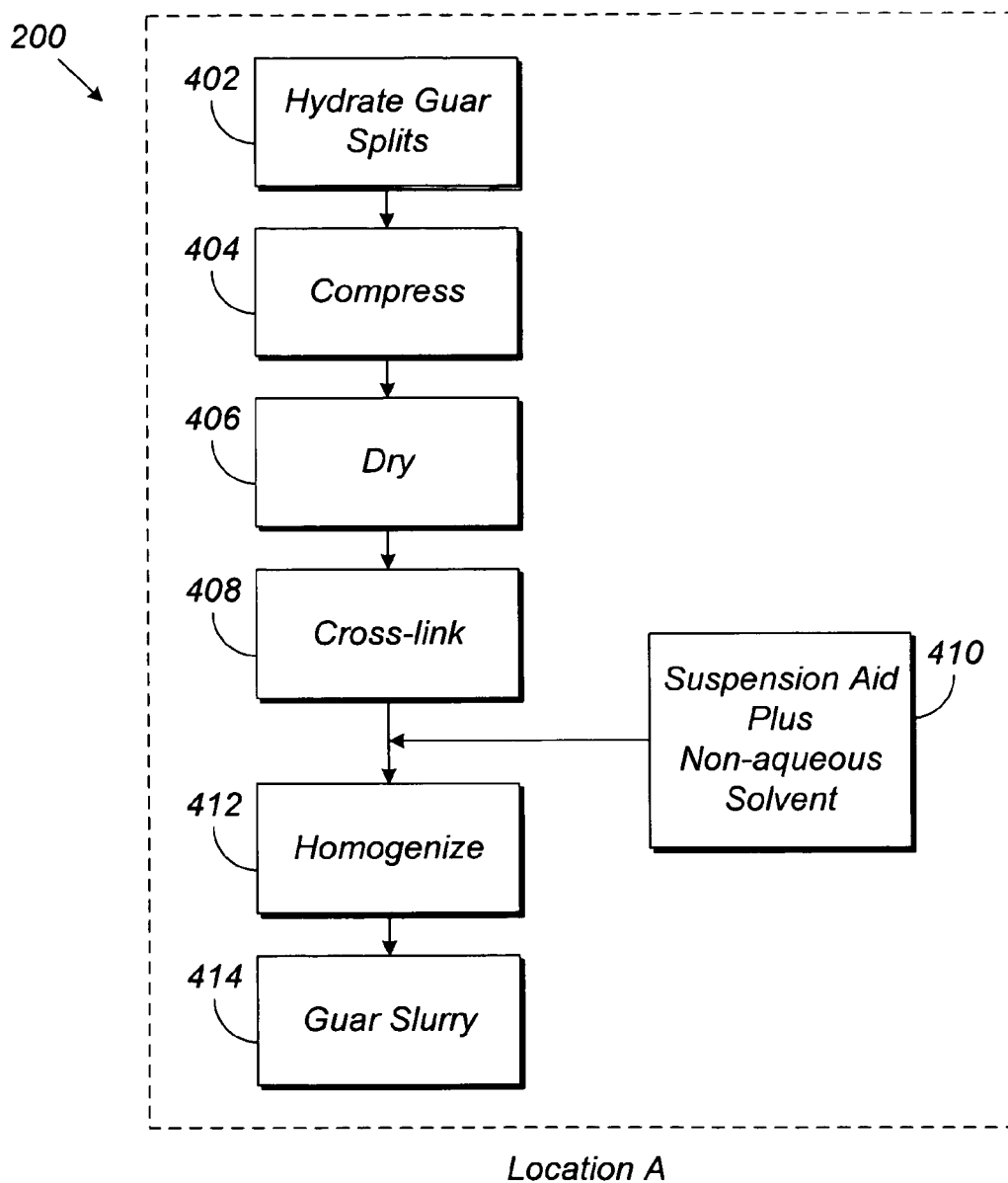
FIG. 4 is a block diagram illustrating a continuous method of preparing guar slurry including a cross-linking compound directly from hydrated guar splits.

The above method, including the addition of the boron cross-linking compound, is illustrated in FIG. 4 via flow chart 400. As can be seen, the method comprises hydrating the guar splits at step 402, compressing the hydrated guar splits at step 404, and de-watering the compressed guar splits at step 406. The method further comprises combining the de-watered guar splits with a boron compound at step 408, adding the de-watered blended guar splits to a non-aqueous solvent at step 410, and homogenizing the non-aqueous solvent/guar splits mixture at step 412 to form a stable suspension of guar particles and a boron cross-linking agent at step 414.

Furthermore, the above method of preparing guar slurry may also be applied to the preparation of an aqueous-based fracturing fluid by adding the stable suspension of guar particles and boron cross-linking agent to water and raising the pH to about 8.5 or greater. The fracturing fluid may then be used to fracture a subterranean formation by injecting the fracturing fluid into a well bore at sufficient rate and pressure to initiate and propagate a fracture. Such a method of forming a fracturing fluid may comprise, for example, hydrating the guar splits, compressing the hydrated guar splits, de-watering the compressed guar splits, combining the de-watered guar splits with a boron compound, adding the de-watered blended guar splits to a non-aqueous solvent, homogenizing the non-aqueous solvent/guar splits mixture to form a stable suspension of guar particles and a boron cross-linking agent, adding the stable suspension of guar particles and boron cross-linking agent to water, and raising the pH to about 8.5 or greater. In some embodiments, the boron compound may be sodium tetraborate, boric acid, and combinations thereof. The boron compound may also be calcium, magnesium borate, and combinations thereof. The preferred boron compound in this embodiment is boric acid, anhydrous borax, or mixtures thereof.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. A continuous method for using hydrated guar splits to form liquid or semisolid suspensions of water-hydratable guar particles in a non-aqueous solvent, comprising:
   a. hydrating guar splits;
   b. compressing the hydrated guar splits to form wet guar flakes;
   c. drying the wet guar flakes;
   d. combining the dried guar flakes with a non-aqueous carrier fluid;
   e. reducing particle size of the guar particles in the guar and non-aqueous carrier fluid mixture.

2. The method of claim 1 wherein the water-hydratable guar particles are carboxyalkyl guar, hydroxyalkyl guar, carboxyalkyl hydroxyalkyl guar, or combinations thereof.

3. The method of claim 1 further comprising the step of homogenizing the guar and non-aqueous carrier fluid mixture.

4. The method of claim 1 wherein the reduced size guar particles have an average particle size distribution range of about 20 to about 60 microns in diameter.

5. The method of claim 1 wherein the direct processing of hydrated guar splits to form liquid suspensions of guar particles in a non-aqueous solvent is continuous and automated.

6. The method of claim 5 wherein the continuous elements may additionally comprise:
   a. side-stream batch additive processes;
   b. re-circulation processes; and
   c. material extraction and recovery processes.

7. The method of claim 6 wherein the continuous elements comprise the addition of suspension aids to non-aqueous solvents.

8. The method of claim 7 wherein the suspension aids may be selected from the group comprising organophilic clays, amorphous silicas, emulsifiers, suspending polymers, and mixtures thereof.

9. The method of claim 5 wherein the continuous elements comprise the recirculation of non-aqueous solvents until the prescribed quantity of guar particles is attained.

10. The method of claim 9 wherein the quantity of guar particles comprises from about 20 percent to about 80 percent by weight of the total weight of the guar slurry.

11. The method of claim 9 wherein the non-aqueous solvents are selected from the list of hydrocarbon oils, medicinal oils, vegetable oils, polyols, glycols, polyethylene glycols, alcohols, and mixtures thereof.

12. The method of claim 1 wherein the hydrated guar splits are compressed by machine processing through a burr mill, an extruder, a roller mill, or a combination of compressing devices.

13. The method of claim 12 wherein the hydrated guar splits are compressed by a roller mill.

14. The method of claim 13 wherein the hydrated guar splits are sequentially compressed two or more times by matched diameter rollers set at rotation ratios of from about 5:1 to about 25:1.

15. The method of claim 1 wherein the hydrated guar splits are dewatered by flash-drying.

16. The method of claim 1 wherein the hydrated guar splits are dewatered during transit through a heated auger.

17. The method of claim 16 wherein the heated auger comprises a bank of heated augers set in parallel.

18. The method of claim 1 wherein the de-watered guar splits are combined with the non-aqueous solvent by means of a homogenizing mixer.

19. A continuous method for using hydrated guar splits to form liquid or semi-solid suspensions of water-hydratable guar particles in a non-aqueous solvent, comprising:
   a. hydrating guar splits;
   b. compressing the hydrated guar splits to form wet guar flakes;
   c. drying the wet guar flakes;
   d. combining the dried guar flakes with a non-aqueous carrier fluid;
   e. homogenizing the guar and non-aqueous carrier fluid mixture; and
   f. shear milling the homogenized guar and non-aqueous carrier fluid mixture to further size-reduce the average particle size of the guar particle.

20. The method of claim 19 wherein the hydrated guar splits are carboxyalkyl guar splits, hydroxyalkyl guar splits, carboxyalkyl hydroxyalkyl guar splits, or mixtures thereof.

21. A continuous method for using hydrated guar splits to form liquid or semi-solid suspensions of water-hydratable guar particles in a non-aqueous solvent, comprising:
   a. hydrating guar splits;
   b. compressing the hydrated guar splits to form wet guar flakes;
   c. drying the wet guar flakes;
   d. combining the dried guar flakes with a non-aqueous carrier fluid and a boron compound;
   e. homogenizing the guar, boron compound, and non-aqueous carrier fluid mixture; and
   f. shear milling the homogenized guar, boron compound, and non-aqueous carrier fluid mixture to further size-reduce the average particle size of the guar particle.

22. The continuous method of claim 21 wherein the boron compound is boric acid or anhydrous borax, or mixtures thereof.

23. A method of forming a fracturing fluid, comprising:
   a. hydrating guar splits;
   b. compressing the hydrated guar splits to form wet guar flakes;
   c. drying the wet guar flakes;
   d. combining-the dried guar flakes with a non-aqueous carrier fluid;
   e. reducing particle size of the guar particles in the guar and non-aqueous carrier fluid mixture, thus forming a suspension of the guar particles;
   f. adding a quantity of the guar suspension to water to form a guar solution; and
   g. pumping the guar solution via a wellbore into a subterranean formation at a pressure sufficient to induce a fracture in the formation rock.

24. The method of claim 23 wherein the guar particles are selected from the group of carboxyalkyl guar, hydroxyalkyl guar, carboxyalkyl hydroxyalkyl guar, and mixtures thereof.

25. The method of claim 23 wherein the guar particles of the guar suspension comprises from 20 percent to about 80 percent by weight of the total weight of the guar suspension, and wherein the guar in water solution contains from about 0.02 percent to about 2 percent by weight guar.

\* \* \* \* \*